US005935669A

United States Patent [19]

Leeuwenburgh

[11] Patent Number: 5,935,669

[45] Date of Patent: Aug. 10, 1999

[54] COVER SHEET FOR PAINTING AND LACQUERING JOBS

[75] Inventor: Peter Leeuwenburgh, Herwijnen, Netherlands

[73] Assignee: TMtape b.v., Netherlands

[21] Appl. No.: 08/906,836

[22] Filed: Aug. 6, 1997

[30] Foreign Application Priority Data

Nov. 8, 1996 [DE] Germany .................... 296 19 424 U

[51] Int. Cl.[6] .................................... B32B 7/06

[52] U.S. Cl. ...................... 428/40.1; 428/126; 428/194; 428/906; 118/505

[58] Field of Search ............................ 428/40.1, 126, 428/194, 906; 118/505, 504; 52/3

[56] References Cited

U.S. PATENT DOCUMENTS 4,889,759 12/1989 Yamazaki ............................ 118/505

*Primary Examiner*—Alexander Thomas

*Attorney, Agent, or Firm*—Diller, Ramik & Wight, PC

[57] ABSTRACT

A cover sheet for painting, plastering, cleaning and lacquering jobs consists of a material sheet (10) folded into at least two folding layers (12*a*–12*h*) with longitudinally extending folds (11*a*–11*h*). A longitudinal edge portion (13) of the material sheet (10) protrudes beyond the other folding layers (12*b*–12*h*), an adhesive tape (16) being fastened along the longitudinal edge portion (13) and protruding laterally beyond the longitudinal edge portion (13). The adhesive-free side (18) of the adhesive tape (16) is provided with a cover strip (20) covering the adhesive tape (16). Using a cover strip and an adhesive tape, the desired properties of this combination may be selected from a great variety of possible combinations by selecting the corresponding tapes and strips.

8 Claims, 1 Drawing Sheet

COVER SHEET FOR PAINTING AND LACQUERING JOBS

BACKGROUND OF THE INVENTION

The present invention refers to a cover sheet for painting and lacquering jobs folded in at least two folding layers, a longitudinal edge portion of the material sheet being provided with an adhesive tape, projecting laterally beyond the longitudinal edge portion.

Such cover sheets are primarily used for painting, plastering, cleaning and lacquering jobs, where large areas, for example, walls, floors or windows must be covered to protect them against paint or plaster splashes, water or the like. Generally, these cover sheets are made of thin plastic material sheets folded in up to 36 folding layers with longitudinally extending folds. For different applications, cover sheets are offered with various adhesive tapes, differing in adhesive, the mechanical properties and thickness. Thus a manufacturer of cover sheets must dispose of a variety of special adhesive tapes to be able to offer all possible combinations of properties. Generally, the folded cover sheets are rolled into rolls, wherein it is necessary that the thickness of the adhesive tape is at least about the same as the thickness of the superposed folding layers. With a large number of folding layers, very thick adhesive tapes have to be used, which, because of their thickness, are available only in relatively short handling lengths of 100 m, for example, which, due to the repeated renewal of the adhesive tape rolls, means a short manufacturing cycle and high production costs.

SUMMARY OF THE INVENTION

It is an object of the present invention to provide a cover sheet that is more simple and less costly to produce.

The cover sheet according to the present invention has a cover strip applied on the adhesive-free rear side of the adhesive tape and covering at least part of the width of the adhesive tape. Only the adhesive tape and the cover strip together have all the desired properties regarding the adhesive, the mechanical properties and the overall thickness of the combination of the adhesive tape and the cover strip. The suitable adhesive strip is primarily selected according to the type of adhesive desired, whereas the cover strip is selected such that the desired total thickness, tensile strength and nature are obtained. Thus, for example, three different kinds of adhesive tapes and three different kinds of cover strips already allow for nine different combinations of adhesive tape and cover strip to be realized. In this manner, a plurality of property combinations of the adhesive tape/cover strip combination may be realized with relatively little stock. Thereby, combinations with properties may be produced that are not available with adhesive tapes having but one layer. Using two tapes, the respective thickness thereof is less than when a single tape has to be made with the desired thickness. Due to the reduced thickness of the adhesive tape and the cover strip, respectively, the processing lengths are greater so that the production process has to be interrupted less often to change an empty tape roll. Thereby, production costs are saved.

In a preferred embodiment, the combined thickness of the adhesive tape and the cover strip is at least about equal to the total thickness of all folding layers of the material sheet. This is necessary in particular when the folded material sheet is rolled lengthwise into a roll. Due to the equal thicknesses of all folding layers and the tapes, the rolled up material sheet layers and the rolled up layers of adhesive tape and cover strip always have the same radial total thickness, i.e. they are always rolled off on the same radius of the roll. The at least about equal thickness of the adhesive tape/cover strip combination and the superposed folding layers even is a prerequisite for rolling the material sheet into a roll.

With a material sheet rolled into a roll, the material sheet may be rolled off such that, as an alternative to the adhesive tape, the adhesive side of the cover strip is exposed, while the adhesive side of the adhesive tape is covered by the rear side of the cover strip. This is achieved by starting the rolling-off operation with pulling off a complete 360° turn of only the cover strip from the underlying adhesive tape. Subsequently, the material sheet is rolled off further, one longitudinal end thereof now being situated between the adhesive tape and the underlying cover strip. At this time, the adhesive side of the cover strip faces downward so that the material sheet may be attached to a surface by the adhesive side of the cover strip. In this way, the user may choose between two adhesive sides of different properties so that he may always select the more suitable adhesive side for a respective surface.

When using thicker material sheets, for example, of a thickness between 50 and 100 $\mu$m, the cover strip only covers part of the adhesive tape width. In particular, the cover strip does not cover that part of the adhesive tape that is adhered to the material sheet in an overlapping manner. Thus, it is prevented that the total thickness becomes too great in the overlapping area which would result in an extreme radius or diameter of the roll, when the sheet is rolled up.

By using a thick cover strip, the number of material sheet folding layers may be increased considerably to up to 32 layers so that material sheets of up to 3 m in width when unfolded may be folded and rolled to form a roll of about 12 cm in length so that comfortable working with short rolls is achieved. The number of folding layers may be selected at random from a wide range, since the folding layer thickness resulting therefrom can always be adjusted by selecting a correspondingly thick cover strip.

Preferably, the cover strip also has an adhesive side by which it is adhered to the rear side of the adhesive tape. Simply adhering the cover strip onto the rear side of the adhesive tape facilitates the production of the adhesive tape/cover strip combination, and, due to the great variety of one-sided adhesive tapes on the market, the production is more variable and more economic.

In a preferred embodiment, the adhesive side of the projecting portion of the adhesive tape is covered by a removable protective tape that is non-adhesive or only weakly adhesive. On the one hand, the adhesive tape increases the total thickness, on the other hand, it makes it possible to just hold the material sheet to the surface to be covered and to still correct it before actually attaching it to that surface. Only when the desired orientation and position of the material sheet has been found, is the protective tape released from the adhesive tape and the adhesive tape attached to the surface.

The adhesives used differ in particular in their adhesive strength and their aggressiveness against or their compatibility with a specific surface material, e.g., steel, anodized aluminum, plastics material, lacquers, wood, glazes, and the like, and in their stability over time and their sensitivity to certain liquids, such as solvents, water, and the like.

The adhesive tape and the cover strip may either be arranged on the folding layer side of the longitudinal edge portion as a so-called outer folding, or they may be provided as an inner folding on the side of the longitudinal edge portion opposite the folding layers.

Preferably, the cover sheet is a plastics material foil, since such foils are available in extremely small thicknesses of about 8–10 μm. Such a plastics material foil may be folded to a high number of layers so that even with great material sheet widths very short rolls of the folded material sheet may be obtained.

A device for producing the above described cover sheet has a material sheet feeding device for supplying the material sheet to a processing device. Further, an adhesive tape feeding device and a cover strip feeding device are provided for supplying the respective tape to the processing device where the cover strip is applied to the adhesive tape and the adhesive tape is applied to the material sheet. With a required minimum total thickness of adhesive tape and cover strip, splitting the tape into an adhesive tape and a cover strip allows for the use of longer tape rolls during production, thereby requiring fewer stops of the adhesive tape feeding device and the cover strip feeding device. Thus, the production is facilitated.

BRIEF DESCRIPTION OF THE DRAWINGS

The following is a detailed description of an embodiment of the present invention taken in conjunction with the accompanying drawings.

In the Figures.

A cover sheet 10 for covering doors, windows, walls, furniture, car body parts, and the like, as a protection against splashes of paint, lacquer, plaster and water, consists of a material sheet which is a dull transparent plastics material sheet 14, the plastics material sheet 14 is made from polyethylene extruded under high pressure and has a thickness of about 10 μm. However, other, even thinner or thicker plastics material foils can be used.

Figure 1:
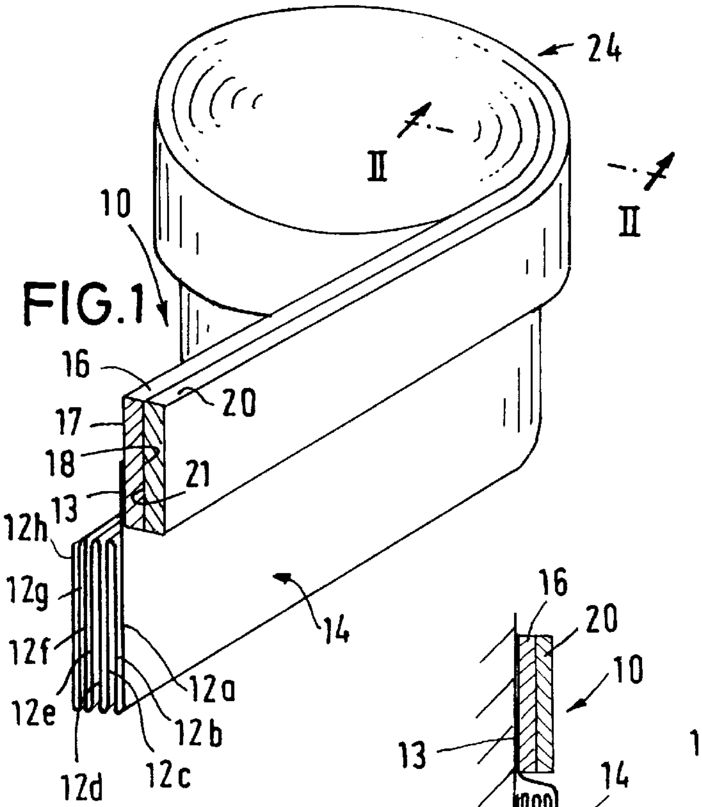
FIG. 1 is a perspective view of a cover sheet rolled into a roll in the longitudinal direction.
Figure 2:
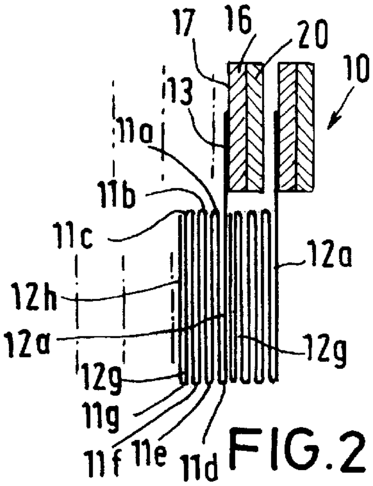
FIG. 2 shows a radial section of the roll of FIG. 1 taken along line II—II.
Figure 3:
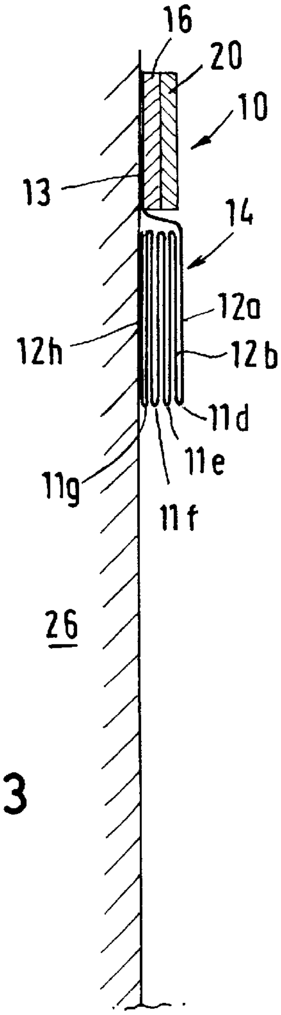
FIG. 3 is a sectional view of the cover sheet of FIG. 1 in a rolled out condition, the cover sheet being attached to a vertical wall.

Referring now to FIGS. 1–3, the plastics material sheet 14 is folded lengthwise with seven longitudinally extending folds 11*a*–11*g* to form eight folding layers 12*a*–12*h*. The seven lower folding layers 12*b*–12*h* are of the same width an are superposed in registry with each other. The topmost folding layer 12*a* is wider than the other folding layers 12*b*–12*h* and has a protruding longitudinal edge portion 13 projecting for about 10 mm beyond the underlying folds 11*a*–11*c* of the underlying seven folding layers 12*b*–12*h*. Thus, the plastics material sheet 14 is folded such that all folding layers 12*a*–12*h* form a stack, and only the protruding longitudinal edge portion 13 of topmost layer 12*a* protrudes by about 10 mm beyond the stack width.

As illustrated in FIG. 1, the longitudinal edge portion 13 is provided with an adhesive tape 16 of 15–25 mm in width, extending in the longitudinal direction and being adhered thereto by its adhesive side 17, the adhesive tape 16 overlappingly adhering on the plastics material sheet 14 by 3–5 mm of its width so that it projects beyond the longitudinal edge portion 13 by more than half its width. The adhesive-free rear side 18 of the adhesive tape 16 has a cover strip 20 adhered thereon by the adhesive side 21 thereof, the cover strip having the same width than the adhesive tape 16 and covering the adhesive tape 16 completely. To save material, the cover strip may also be made narrower than the adhesive tape. The adhesive tape 16 is a crepe tape with an adhesive sticking well on paper, wall paper and the like, the tape, however, being easily removable without damage to the underlying surface. The cover strip 20 also is a crepe tape. Both tapes 16, 20 together have a thickness of about 250 μm, which approximately corresponds to the superposed folding layers 12*a*–12*h* including the air entrapped thereby.

As illustrated in FIG. 1, the plastics material sheet 14 is rolled into a roll 24, the top folding layer 12*a* having the longitudinal edge portion 13 and the tapes 16, 20 being located radially outward, while the other layers 12*b*–12*h* are located radially inward.

Unfolded, the plastics material sheet 14 has a width of 100 cm so that the roll 24 with eight folding layers 12*a*–12*h has* a length of about 16 cm. Folding a plastics material sheet of 260 cm in width into 16 layers, the length of the roll would be about 20 cm, including the adhesive tape 16.

However, plastics material sheets of 300 cm and more in width may be used, which can be folded into up to 32 folding layers with a roll length of 12 cm. The overall height of the adhesive tape/cover strip combination is then adjusted by selecting a correspondingly thicker cover strip. Here, the cover strip may readily be selected with a view to the desired (mechanical) properties of the adhesive tape/cover strip combination, such as resistance to humidity or tensile strength. The adhesive tape 16, however, is selected primarily for its adhesive properties. The adhesive of the adhesive tape 16 may have special properties depending on the kind of surface, providing the optimum adjusted properties for a particular surface, such as adhesive strength, solubility and durability over time of the adhesive. The other properties of the adhesive tape/cover strip combination are determined by a suitably selected cover strip.

Figure 4:
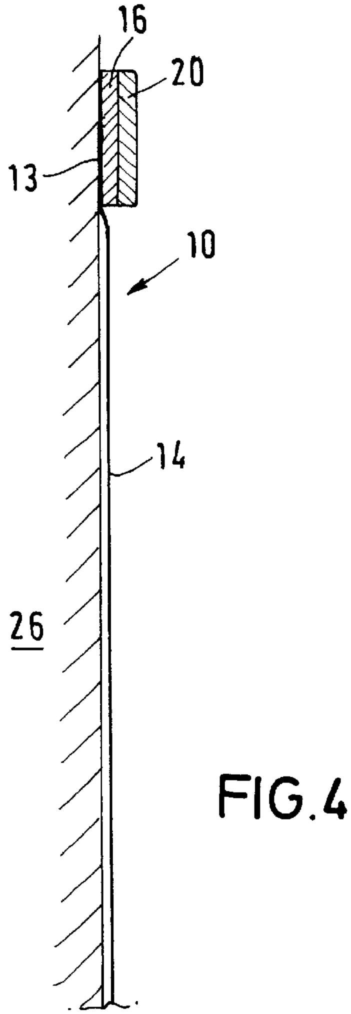
FIG. 4 shows the cover sheet of FIG. 3 in the spread state.

For covering a surface, for example, to protect it against splashes of paint and lacquer during painting and lacquering jobs, the roll 24 is taken into one hand and the plastics material sheet 14 is held against the respective surface, such as a wall 26 shown in FIGS. 3 and 4, and then it is rolled off along the wall 26. With the other hand, the adhesive tape 16 is pressed against the wall 26 so that the adhesive tape 16 adheres immediately. After having rolled off the desired length, the roll 24 is cut from the attached cover sheet 10. The plastics sheet 14 still folded up is attached to the wall 26, the stack of folding layers being held together by electrostatic forces between the folding layers 12*a*–12*h*. The lowermost folding layer 12*h* lies on the wall 26 over the entire width thereof, while only the projecting longitudinal edge portion 13 of the topmost layer 12*a* lies on the wall 26 to which it is attached, extending in a S-shaped section. The plastics material sheet 14 is now spread along its entire width by pulling the lowermost layer 12*h* downward. Thus, the folding layers 12*b*–12*h* unfold to form a wide material sheet 14 smoothly lying on the wall 26, as illustrated in FIG. 4.

When producing the cover sheet, the plastics material sheet 14, the adhesive tape 16 and the cover strip 20 are supplied separately to a processing device, where the adhesive tape 16 is applied onto the plastics material sheet 14 and the cover strip 20 is applied onto the adhesive tape 16. By separating the adhesive tape 16 and the cover strip 20, thinner adhesive tapes and cover strips may be used than when the necessary total thickness had to be filled with a single tape. Thus, for a given maximum tape roll diameter, considerably longer adhesive tape and cover strip rolls may be used, having a length of several 100 m. Thereby, the duration of a production cycle until replacement of the empty tape rolls is extended considerably, whereby production costs can be saved.

To configure an adhesive tape/cover strip combination with particular mechanical properties and adhesive properties, standard tapes may be used that are readily available in various and, if desired, great lengths and at low cost. Thus, the material costs for the adhesive tape and the cover strip together are often lower than when a single special tape with all those properties had to be produced or purchased.

Although the present invention has been described hereinabove with reference to a particular embodiment thereof, many modifications and alterations may be made to the invention, as readily obvious to the expert in the field, without departing from the scope of the invention as defined in the accompanying claims.

We claim:

1. A cover sheet for painting and lacquering jobs comprising a material sheet (10) folded into at least two folding layers (12*b*–12*h*) with longitudinally extending folds (11*a*–11*g*), a longitudinal edge portion (13) of said material sheet (10) protruding beyond the at least two folding layers (12*b*–12*h*), an adhesive tape (16) being provided longitudinally along said longitudinal edge portion (13), the adhesive tape (16) protruding laterally beyond said longitudinal edge portion (13), said adhesive tape (16) having an adhesive-free side (18), a cover strip (20) applied to the adhesive-free side (18) of the adhesive tape (16), and the total thickness of said adhesive tape (16) and said cover strip (20) being substantially at least equal to the thickness of said at least two folding layers (12*b*–12*h*).

2. The cover sheet of claim 1, wherein the folded material sheet (10) is rolled lengthwise to form a roll (24).

3. The cover sheet of claim 1, wherein said cover strip (20) has an adhesive side (21) by which it is adhered to said adhesive tape (16).

4. The cover sheet of claim 1, wherein said adhesive side (17) of the protruding part of said adhesive tape (16) is covered by a removable protective strip.

5. The cover sheet of claim 1, wherein said adhesive tape and said cover strip are arranged on the folding layer side of said longitudinal edge portion.

6. The cover sheet of claim 1, wherein said adhesive tape and said cover strip (16, 20) are provided on the side of said longitudinal edge portion (13) opposite said folding layers (12*b*–12*h*).

7. The cover sheet of claim 1, wherein said material sheet is folded into more than ten folding layers.

8. The cover sheet of claim 1, wherein said material sheet (10) is a plastics material foil.

* * * * *